UNITED STATES PATENT OFFICE.

ARZA T. LYON, OF CINCINNATI, OHIO, ASSIGNOR TO THE INDESTRUCTIBLE BUILDING MATERIAL COMPANY OF OHIO.

IMPROVEMENT IN PAINT COMPOUNDS.

Specification forming part of Letters Patent No. 164,851, dated June 22, 1875; application filed June 17, 1875.

*To all whom it may concern:*

Be it known that I, ARZA T. LYON, of Cincinnati, in the county of Hamilton and State of Ohio, have invented certain new and useful Improvements in Asbestus Mastic and Paint, of which the following is a specification:

This invention relates to a new composition of matter to be employed as a paint or mastic for coating or covering the surfaces of wood, metal, canvas, paper, felt, stone, and all other materials to which paints or mastics are usually applied, for the purpose of protecting the same from the disintegrating action of the weather, or the destructive influence of fire, or the corrosive action of various chemical agents, and is intended as an improvement upon the Letters Patent granted to me June 8, 1875. The invention consists in a composition of lime, alum, sulphate of zinc, linseed-oil, asbestus, coal-ashes, nitrate of lead, whiting, and white lead, prepared as hereinafter fully set forth, and mixed with boiled linseed-oil and any desired coloring matter.

To prepare the compound, take two hundred pounds of unslaked lime, fifteen pounds of lump alum, ten pounds of sulphate of zinc, and, after reducing the same to powder, thoroughly mix the mass with boiled linseed-oil sufficient to bring it to the consistency of putty, after which spread it out and submit it to the action of the atmosphere until the ingredients are chemically combined. This I call my "lime compound." Then take two hundred and fifty pounds of asbestus and twenty-five pounds of coal-ashes and grind the two to powder, and dampen the mass with a mixture composed of one-quarter of a pound of bisulphide of carbon, one ounce of chloride of zinc, one-quarter of a pound of nitrate of lead, and one ounce of chloride of sodium or common salt. Then take eight parts of the mixture and thoroughly mix with it one part of whiting and two pounds of white lead. One part of the first-prepared compound is then thoroughly mixed and commingled with six parts of the last-prepared compound, and the whole ground up with boiled linseed-oil and any desired coloring matter. The proportion of oil will vary, of course, according to the use to which the compound is to be applied. When used as a paint, the oil must be in sufficient quantity to bring the mass to the consistency of ordinary paint, and, when employed as a mastic, in less quantity, or about sufficient to bring it to the consistency of ordinary plasterer's mortar. After mixing the two compounds, as described, my improved composition is ready for use and may be applied with an ordinary paint-brush, or with a trowel, or by any other means commonly employed for coating articles with paint or covering the same with mastic.

Having thus described my invention, what I claim, and desire to secure by Letters Patent, is—

A paint or mastic composition consisting of caustic lime, alum, sulphate of zinc, bisulphide of carbon, chloride of zinc, nitrate of lead, chloride of sodium, whiting, and white lead, compounded and mixed with boiled linseed-oil and a suitable coloring matter, substantially as set forth.

In testimony that I claim the foregoing I have hereunto set my hand in the presence of the subscribing witnesses.

ARZA T. LYON.

Witnesses:
B. F. HOLLISTER,
W. C. COCHRAN.